United States Patent Office  2,940,957
Patented June 14, 1960

2,940,957

POLYMERIC METAL-ORGANIC COMPOSITIONS

Daniel F. Herman, Orange, N.J., assignor to National Lead Company, New York, N.Y., a corporation of New Jersey No Drawing. Filed May 24, 1956, Ser. No. 586,911

8 Claims. (Cl. 260—78.5)

This invention relates to metal-organic compositions. More specifically it relates to the formation of titaniferous organic polymers and to their method of preparation.

Many types of thermal plastic and resinous materials have been produced from styrene, acrylates, substituted acrylates, butadiene and the like and such products possess a variety of properties when prepared by the different processes. It is desirable to combine such materials with titanium compounds since the titanium compounds possess unusual properties.

This application is a continuation-in-part of my copending application Serial No. 198,223, filed November 29, 1950, now abandoned.

An object of the instant invention is to prepare copolymers of styrene, acrylates, alkyl substituted acrylates and butadiene with organo-titanium compounds. Another object is to prepare copolymers of vinyl monomers containing organo-titanium compounds which can be molded and which can be used for a variety of novel applications. These and other objects will become more apparent from the following more complete description of the instant invention.

In its broadest aspects this invention contemplates the preparation of copolymers of vinyl monomers and an organo-titanium compound, said compound consisting essentially of an alkoxytitanium acylate, the alkoxy group in said compound is a monohydric, saturated, nonsubstituted group containing from 2 to 20 carbon atoms, the acylate group is selected from the group consisting of acrylate, alkyl substituted acrylate and maleate, said alkoxy titanium acylate containing from 2 to 3 alkoxy groups per titanium atom and containing from 1 to 2 carbonyloxy groups per titanium atom, the sum of the alkoxy and carbonyloxy groups being substantially 4 per titanium atom. By the term "alkyl substituted acrylates" is meant to include compounds containing from 1 to 4 carbon atoms in the alkyl group.

The alkoxytitanium acylate may be prepared in a number of ways, for example, by reacting an alkyltitanate with an unsaturated acid.

The alkoxy group of the alkyl titanate may contain from 2 to 20 carbon atoms, and preferably is derived from a saturated, nonsubstituted monohydric alcohol. Among the preferred alcohols are propyl, butyl and amyl alcohols as well as higher alcohols such as undecyl, cetyl and eicosyl alcohols.

The alkyl titanates may be prepared by many methods such as, for example, the reaction of titanium tetrachloride with a monohydric alcohol. A convenient method of carrying out this reaction is described in the Nelles Patent No. U.S. 2,187,821. A convenient way of preparing a titanate of a higher alcohol is to react a higher alcohol with an alkyl titanate of a lower alcohol through an ester interchange, wherein the lower alcohol is replaced by the higher alcohol.

The preparation of the alkoxytitanium acylate may be carried out in the following manner:

The alkyl titanate and the unsaturated organic acid are mixed in a distilling flask, whereupon the acid radical replaces one or more alkoxy groups of the alkyl titanate and the alcohol formed is removed by distillation. Normally the distillation is carried out at low temperatures under vacuum using a steam bath as the source of heat. An absolute pressure of about 70 mm. mercury is obtained at the start and is gradually reduced to about 1 mm. of mercury at the end of the distillation. The distillation is usually completed in a short period of time.

Most of the compounds contemplated by this invention may be made directly by the procedures described above, except those in which the acid used boils at a lower temperature than the alcohol to be removed from the alkyl titanate. In this case an indirect procedure is employed which comprises selecting an alkyl titanate which contains an alkoxy group derived from an alcohol having a boiling point lower than the boiling point of the organic acid to be employed. This alkyl titanate is then mixed with the desired high boiling point alcohol. This mixture is then heated in a distilling flask and a portion of the lower boiling point alcohol is removed. The amount of low boiling point alcohol removed is equivalent to the amount of high boiling point alcohol added. The amount of high boiling point alcohol added may vary from 2 to 3 moles per mole of titanium depending upon the type of final titanate desired. This, therefore, produces a mixed titanate containing both of the alkoxy groups. The mixed titanate produced is then mixed with the low boiling point organic acid, the mixture is heated and the remaining low boiling point alcohol is removed by distillation, thus producing an alkoxy titanium acylate containing an alkoxy group or groups derived from a high boiling point alcohol and an acylate group or groups derived from a low boiling point acid.

The following examples are presented to illustrate both the preparation of various alkoxy titanium acylate compositions and the copolymers formed therefrom:

EXAMPLE 1

*Preparation of tributoxytitanium monomethacrylate*

245 parts of butyl titanate were mixed with 62 parts of methacrylic acid in a distilling flask and the distillation was carried out at 37° C. at less than 1 mm. pressure. 44.3 parts of butyl alcohol were removed during the distillation process. 257 parts of a fluid orange liquid were obtained which contained 21.4% titanium calculated as $TiO_2$, which is substantially equal to the theoretical amount to form tributoxytitanium monomethacrylate. The viscosity of the solution was 85 centipoises and the density was 1.0439 at 26° C. The liquid product was soluble in dioxane, petroleum ether, benzene diethyl ether, methyl alcohol and butyl alcohol. The liquid readily hydrolyzed on exposure to air and water, and formed a cloudy solution with acetic acid and acetone.

This mass which contains a methacrylic group may be copolymerized with methyl methacrylate to form a synthetic resin. The synthetic resin was prepared by mixing 50 parts of tributoxytitanium monomethacrylate with 50 parts of methyl methacrylate in the presence of 0.1% benzoyl peroxide and heating to 90° C. for 4 hours to form the synthetic resin. The synthetic resin was a soft rubbery-like amber colored solid material, which is stable and resistant to exposure to moisture.

EXAMPLE 2

*Preparation of dibutoxytitanium dimethacrylate*

124 parts of methacrylic acid were added to 245 parts of butyl titanate and the distillation was carried out according to the procedure described in Example 1. 244 parts of a light yellow colored liquid were obtained containing 22.3% titanium, calculated as TiO₂. The fluid product was soluble in benzene, carbon tetrachloride, butyl alcohol, petroleum ether, dioxane, methyl alcohol and acetone.

A copolymer was prepared by reacting 50 parts of dibutoxytitanium dimethacrylate with 50 parts of styrene in the presence of 0.1% benzoyl peroxide and heating at 90° C. for 4 hours. A hard amber solid material was obtained. The copolymer was then molded at 140° C. under 10,000 lbs. per sq. in. pressure to obtain a disc. The disc was unaffected by moisture. The dielectric properties were measured at 1,000 kc. and the following results were obtained:

The dielectric constant was 3.33 with a dissipation factor of 0.0089.

The dibutoxytitanium dimethacrylate was also used as a cross linking agent in the polymerization of butadiene. 7.5 parts of butadiene were mixed with 0.5 part of dibutoxytitanium dimethacrylate, 35 parts toluene and 0.04 part benzoyl peroxide. The mixture was heated at 90° C. for 71 hours to form a firm yellow gel. The toluene was removed by distillation under vacuum and a clear, tough, rubber, product was obtained. The rubber product was insoluble in organic solvents thereby indicating high molecular weight cross-linking elements.

EXAMPLE 3

*Preparation of dibutoxytitanium monomaleate*

170 parts of butyl titanate were mixed with 58 parts of maleic acid in a distilling flask and the mixture was heated to 40° C. under vacuum and the distillation was carried out at 3 mm. Hg. 71 parts of butyl alcohol were liberated during the distillation. 158 parts of a yellow polymeric solidified mass were obtained which analyzed 25.6% titanium, calculated as TiO₂. The product was soluble in butanol, benzene and carbon tetrachloride, dioxane, toluene, methanol and gave a milky white solution in both acetic acid and acetone. The M.W. determined by cryoscopic method using benzene as a solvent was 2230, containing approximately 7 dibutoxytitanium maleate units per molecule. The material is polymeric since the maleate group is dicarboxylic and therefore is capable of linking with two titanium atoms.

This mass which contains a maleate group may be copolymerized with styrene to form thermoplastic materials.

In order to prepare the thermoplastic materials, 50 parts of dibutoxytitanium monomaleate were mixed with 50 parts of styrene in the presence of 0.1% benzoyl peroxide and heated at 90° C. for 4 hours to form a copolymer which produced a hard, amber colored solid material. The copolymer was then heated at 140° C. and compressed at 10,000 lbs. per sq. in. pressure to obtain a molded product. The product was hard and clear and possessed a uniform appearance. It was resistant upon exposure to moisture.

EXAMPLE 4

*Preparation of diundecoxytitanium diacrylate*

137.5 parts of undecyl alcohol were added to 136 parts of butyl titanate in order to prepare diundecoxydibutoxytitanium. The reaction was carried out according to the procedure described in Example 1 and 213 parts of a light colored liquid containing 14.7% titanium, calculated as TiO₂, was obtained. This liquid was analyzed and found to be equal to the formula of diundecoxydibutoxytitanium. This product was then mixed with 58.2 parts of acrylic acid and the distillation was carried out at 30° C. maintaining the pressure below 1 mm. of mercury. The distillation was continued for 1 hour. 198 parts of an amber colored liquid containing 15.2% titanium, calculated as TiO₂, was obtained. The liquid was soluble in benzene, carbon tetrachloride, petroleum ether, dioxane and butyl alcohol. It was insoluble in methyl alcohol and gives a milky precipitate in acetone.

In order to prepare a copolymer of diundecoxytitanium diacrylate with styrene, 50 parts of diundecoxytitanium diacrylate were reacted with 50 parts of styrene in the presence of 0.1% benzoyl peroxide and heated to 90° C. for 4 hours. A hard amber colored solid was obtained which could be molded at 140° C. under pressure.

The alkoxytitanium acylates readily form copolymers with vinyl monomers in general and such copolymers have unique properties since they contain organo-titanium compounds. These copolymers may be molded at moderate temperatures and they possess unusual dielectric properties, good impact resistance and high tensile strength.

While this invention has been described and illustrated by the examples shown, it is not intended to be strictly limited thereto and other modifications and variations may be employed within the scope of the following claims.

I claim:

1. A resinous copolymer of a monomer selected from the group consisting of butadiene, methyl acrylate, methyl methacrylate and sytrene and a titanium organic compound, said compound consisting essentially of an alkoxytitanium acylate, the alkoxy in said compound contains from 2 to 20 carbon atoms, the acylate group is selected from the group consisting of acrylate, alkyl substituted acrylate and maleate, said alkoxytitanium acylate containing from 2 to 3 alkoxy groups per titanium atom and containing from 1 to 2 carbonyloxy groups per titanium atom and attached to said titanium atom, the sum of the alkoxy and said carbonyloxy groups being substantially 4 per titanium atom.

2. Composition according to claim 1 in which the titanium organic compound is alkoxytitanium methacrylate.

3. Composition according to claim 1 in which the titanium organic compound is alkoxytitanium acrylate.

4. Composition according to claim 1 in which the titanium organic compound is alkoxytitanium maleate.

5. Composition according to claim 1 in which the monomer is butadiene.

6. Composition according to claim 1 in which the monomer is methyl acrylate.

7. Composition according to claim 1 in which the monomer is methyl methacrylate.

8. Composition according to claim 1 in which the monomer is styrene.

References Cited in the file of this patent

UNITED STATES PATENTS

| | | |
|---|---|---|
| 2,253,128 | Langkammerer | Aug. 19, 1941 |
| 2,258,718 | Rothrock | Oct. 14, 1941 |
| 2,273,891 | Pollack | Feb. 24, 1942 |
| 2,397,287 | Ostberg | Mar. 26, 1946 |
| 2,489,651 | Langkammerer | Nov. 29, 1949 |
| 2,621,193 | Langkammerer | Dec. 9, 1952 |

OTHER REFERENCES

Lange: Handbook of Chemistry, 7th ed. (1950), pages 58–59.